US010824383B2

(12) United States Patent
Chang et al.

(10) Patent No.: US 10,824,383 B2
(45) Date of Patent: Nov. 3, 2020

(54) DISPLAY DEVICE

(71) Applicant: PEGATRON CORPORATION, Taipei (TW)

(72) Inventors: Cheng-Wen Chang, Taipei (TW); Chen-Yu Tsai, Taipei (TW); Chun-Yuan Wang, Taipei (TW); Cheng-Yi Lee, Taipei (TW)

(73) Assignee: Pegatron Corporation, Taipei (TW)

( * ) Notice: Subject to any disclaimer, the term of this patent is extended or adjusted under 35 U.S.C. 154(b) by 0 days.

(21) Appl. No.: 16/459,961

(22) Filed: Jul. 2, 2019

(65) Prior Publication Data

US 2020/0012472 A1  Jan. 9, 2020

(30) Foreign Application Priority Data

Jul. 5, 2018  (TW) .............................. 107123350 A

(51) Int. Cl.
*G06F 3/14* (2006.01)
*G02F 1/01* (2006.01)
(52) U.S. Cl.
CPC .......... *G06F 3/1446* (2013.01); *G02F 1/0102* (2013.01)
(58) Field of Classification Search
None
See application file for complete search history.

(56) References Cited

U.S. PATENT DOCUMENTS

| 2015/0002371 | A1* | 1/2015 | Burgess | G09G 5/12 |
| | | | | 345/1.2 |
| 2015/0254045 | A1* | 9/2015 | Drake | G06F 3/1446 |
| | | | | 345/1.3 |
| 2019/0004764 | A1* | 1/2019 | Son | G06F 3/147 |

FOREIGN PATENT DOCUMENTS

CN  108027650 A  5/2018

* cited by examiner

*Primary Examiner* — Nicholas J Lee
(74) *Attorney, Agent, or Firm* — Muncy, Geissler, Olds & Lowe, P.C.

(57) ABSTRACT

The present disclosure discloses a display device, which includes a casing, a plurality of proximity sensors, a communication module, a display screen, and a processing module. The proximity sensors are disposed with respect to the side walls of the casing, and the proximity sensors generate a position signal when other display device is close to the casing. The communication module is disposed in the casing, and the communication module is used for communicating with the other display device. The processing module electrically connects to the proximity sensors and the communication module. The processing module controls the display screen to show a particular frame according to the position signal, and the other display screen of the other display device to show the other particular frame via the communication module, wherein the particular frame is capable of being combined with the other particular frame to be an entire frame.

4 Claims, 3 Drawing Sheets

DISPLAY DEVICE

CROSS-REFERENCE TO RELATED APPLICATION

This application is based upon and claims priority of Taiwan Patent Application No. 107123350, filed on Jul. 5, 2018, the contents being incorporated herein by reference.

BACKGROUND

1. Technical Field

The present disclosure relates to a display device, particularly to a display device that can be used in combination with the other display device.

2. Description of the Related Art

Most electronic devices have a display device; for example, a smart phone, a tablet computer, or a notebook computer has a display panel for displaying pictures or images. With the advancement of technology, display technology is not only focusing on image output resolutions, but also developed in a more diversified way. For example, there are more than two display devices (referred to herein as a combination display device) to jointly show a frame, currently. In other words, with a combination of two or more display devices, a larger screen can be obtained for users with expanded screen requirements.

Currently, two or more display devices are connected to each other in a wired manner. However, the limited number of ports and the limited size restrict the number of display devices that can be combined. That is, if a display device needs to be connected to a plurality of display devices, the number of ports must be increased, which may increase the thickness and volume of the display device. Further, it is quite inconvenient that the user need to plug a cable into each port before combining the display devices.

To solve the inconvenience of the wired connection, the wireless local area network (LAN) connection is also used to connect two or more display devices. However, when connecting by wireless communication, the user must specify the position of each display device, and the processor can adjust the display content according to the position of each display device, such that a plurality of display devices can jointly show one frame.

Therefore, whether connecting a plurality of display devices in a wired or wireless manner, the operation of connecting the display devices are quite inconvenient. There is a need for improvement.

SUMMARY

In view of the above issues, it is a primary objective of the present invention to provide a display device. The display device has a plurality of proximity sensors. Further, when the other display device is close, part of the proximity sensors can generate a position signal to solve the problem that the operation of connecting the prior art display devices is quite inconvenient.

To achieve the above objective, the present disclosure provides a display device, which includes a casing, a plurality of proximity sensors, a communication module, a display screen, and a processing module. The casing has a plurality of side walls. Each of the proximity sensors is disposed on each side wall of the casing. Each of the proximity sensors is used to generate a position signal when detecting that there is the other display device close to the casing. The communication module is disposed in the casing, and is used for communicating with the other display device. The display screen disposed on the casing. The processing module is electrically connected to the proximity sensors and the communication module. The processing module controls the display screen to show a particular frame according to the position signal, and the other display screen of the other display device to show the other particular frame via the communication module, wherein the particular frame is capable of being combined with the other particular frame to be an entire frame.

According to an embodiment of the present disclosure, the number of proximity sensors is the same as the number of side walls.

According to an embodiment of the present disclosure, the proximity sensors are respectively disposed at corners defined between every two of the side walls being adjacent.

According to an embodiment of the present disclosure, the display device further includes a plurality of magnets respectively disposed on the side walls of the casing. Each of the proximity sensors is a magnetic field sensor. When the display device is close to the casing, the magnet close to the other display device is magnetically attracted to a magnet of the other display device, and the proximity sensor closed to the other display device generates the position signal according to changes in a magnetic field.

According to an embodiment of the present disclosure, the number of magnets is twice the number of side walls. The magnets are respectively disposed at two ends of each side wall.

According to an embodiment of the present disclosure, the display device further includes an infrared emitting unit. The proximity sensors receive infrared light to generate the position signal.

According to an embodiment of the present disclosure, the display device further includes a plurality of magnets respectively disposed on the side walls of the casing. When the other display device is close to the casing, the magnet close to the other display device is magnetically attracted to a magnet of the other display device.

According to an embodiment of the present disclosure, the number of magnets is twice the number of side walls. The magnets are respectively disposed at two ends of each side wall.

According to an embodiment of the present disclosure, the communication module is a near field communication module.

According to an embodiment of the present disclosure, when the other display device is close to the casing, the processing module controls the communication module to communicate with the communication device of the other display device according to the position signal.

As above, the display device according to the present disclosure includes a casing, a plurality of proximity sensors, a communication module, a display screen, and a processing module. Each of the proximity sensors is disposed on each side wall of the casing. The proximity sensors generate a position signal when detecting that there is the other display device close to the casing. The processing module can determine the position of the display device according to the position signal to control the display screen to show a particular frame without complicated settings, which is quite convenient in operation.

DETAILED DESCRIPTION OF THE PREFERRED EMBODIMENT

Hereafter, the technical content of the present disclosure will be better understood with reference to preferred embodiments.

Figure 1:
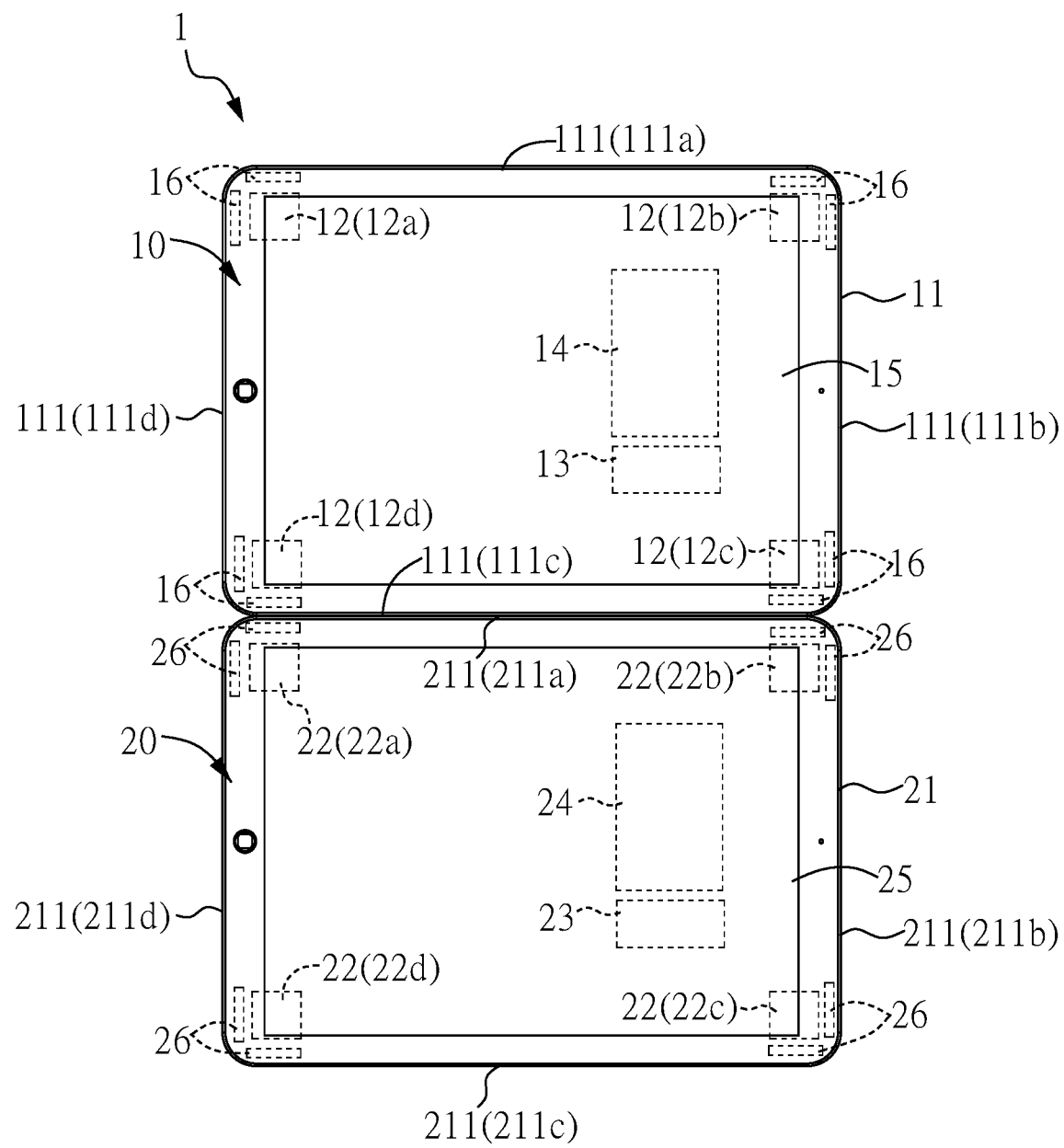
FIG. 1 is a schematic diagram showing that a display device is used in combination with the other display device in an embodiment of the present disclosure.
Figure 2:
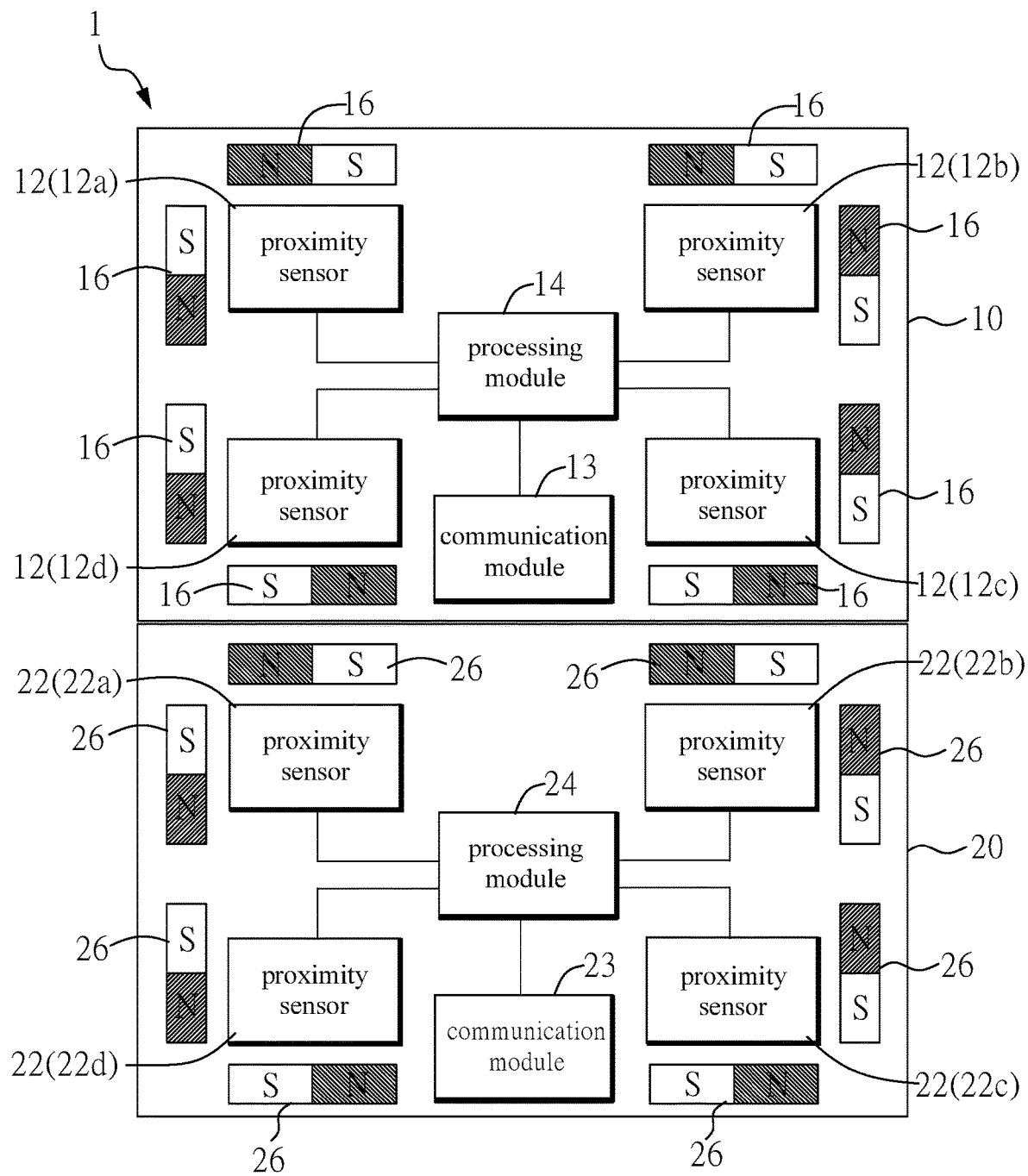
FIG. 2 is a block diagram of the display devices shown in FIG. 1.

FIG. 1 is a schematic diagram showing that a display device is used in combination with the other display device in an embodiment of the present disclosure. FIG. 2 is a block diagram of the display devices shown in FIG. 1. Referring to both FIG. 1 and FIG. 2, the display device 10 of the present embodiment can be used in combination with the other (another) display device 20, which is called a combination display device 1. The combination display device 1 is capable of being combined by a plurality of display devices, which can be used in combination when the user wants to enlarge the screen. In this specification, the two display devices 10, 20 are used as examples, and they are called display device 10 and display device 20. In other words, the combination display device 1 of the present embodiment includes at least one display device 10 and the other display device 20. Moreover, the display device 10, 20 can be an electronic device with a display screen, such as a smart phone, a tablet computer, or a notebook computer. Preferably, the display device 10, 20 are the electronic devices can be flat placed, such as a smart phone, or a tablet computer.

First, the display device 10 is used as an example. The display device 10 includes a casing 11, a plurality of proximity sensors 12, a communication module 13, a processing module 14, and a display screen 15. The display device 10 of the present embodiment is polygon, and correspondingly the casing 11 has a plurality of side walls 111. Preferably, the display device 10 is a quadrangular shape. Correspondingly, the casing 11 has four side walls 111 (111a, 111b, 111c, 111d). The display device 10 may also be other shapes, and the number of the side wall 111 may be different.

The number of the proximity sensors 12 is the same as the number of the side walls 111. The display device 10 in this embodiment has four proximity sensors 12 (12a, 12b, 12c, 12d) that are disposed in the casing 11. Further, the proximity sensors 12 in the present embodiment are used to detect whether there is the other display device (such as the display device 20) close to the display device 10, that is, detect whether there is the other display device 20 close to the casing 11. Therefore, the position of the proximity sensors 12 can correspond to the side walls 111. That is, each of the proximity sensors 12 is disposed on one of the side walls 111, and the four proximity sensors 12a, 12b, 12c, 12d are respectively disposed on the four side walls 111a, 111b, 111c, 111d. Preferably, the proximity sensors 12 can also be respectively disposed at corners defined between the two adjacent side walls 111. For example, the proximity sensors 12a can be disposed between the two adjacent side walls 111a, 111d. In other words, the four proximity sensors 12a, 12b, 12c, 12d are disposed at the four corners of the quadrilateral casing 11. In the present embodiment, the proximity sensors disposed at the angles of the casing 11 are used as an example. Further, the communication module 13 and the processing module 14 are disposed in the casing 11, and the display screen 15 is disposed on the casing 11, preferably, disposed on a surface of the casings 11. The processing module 14 is coupled to the proximity sensors 12, the communication module 13, and the display screen 15.

The display device 20 has the same configuration as the display device 10, and the display device 20 also includes a casing 21, a plurality of proximity sensors 22, a communication module 23, a processing module 24, and a display screen 25. The communication module 23 and the processing module 24 are both disposed in the casing 21. The display screen 25 disposed on a surface of the casing 21. Further, the processing module 24 is coupled with the proximity sensors 22, the communication module 23, and the display screen 25.

The display device 20 is also a quadrangular shape, so the casing 21 has four side walls 211 (211a, 211b, 211c, 211d). Moreover, the number of the proximity sensors 22 is the same as the number of the side walls 211, and the four proximity sensors 22 (22a, 22b, 22c, 22d) are disposed in the casing 21. Similarly, each of the proximity sensors 12 is disposed on each side walls 111 of the casing 21, and the proximity sensors 22 are also respectively disposed at the corners defined between the two adjacent side walls 211. For example, the proximity sensors 22a are disposed between the two adjacent side walls 211a, 211d, and the four proximity sensors 22 are respectively disposed at the four angles of the casing 21.

The proximity sensors 12, 22 are used to detect whether there is the other display device close to or present. In the present embodiment, the proximity sensors 12, 22 can determine whether there is the other display device around by detecting changes in the magnetic field. Specifically, the proximity sensors 12, 22 in the present embodiment are respectively a magnetic field sensor, and the display device 10 further includes a plurality of magnets 16, respectively disposed on the side walls 111 of the casing 11, and adjacent to the proximity sensors 12. Similarly, the display device 20 also includes a plurality of magnets 26 respectively disposed on the side walls 211 and adjacent to the proximity sensors 22.

Preferably, the number of the magnet 16 (or 26) of the present embodiment is twice the number of the side wall 111 (or 211), such that the magnet 16 (or 26) can be disposed at two ends of each the side wall 111 (or 211). Taking the display device 10 as an example, the number of the magnets 16 is twice that of the side walls 111. The shape of the casing 11 is quadrilateral, and the number of side walls 111 is four. Correspondingly, the number of magnets 16 can be eight. Two magnets 16 are disposed on each of the side walls 111, and the magnets 16 are respectively disposed at two ends of the side walls 111. As shown in FIG. 1 and FIG. 2, the proximity sensors 12 and the magnets 16 are all disposed at the angle of the casing 11.

When a user wants to expand the screen, the user can combine the display device 10 and the other display device 20. That is, the display device 10 is disposed adjacent to the other display device 20. When the display device 10 and the other display device 20 are close to each other, part of the proximity sensors 12 of the display device 10 and part of the proximity sensors 22 of the display device 20 are close to each other, such as the proximity sensors 12c, 12d (disposed on the side wall 111c) are close to the proximity sensors 22a, 22b (disposed on the side wall 211a), as shown in FIG. 1 and FIG. 2. Similarly, the magnet 16 disposed on the side wall 111c also close to the magnet 26 disposed on the side wall 211a, and the magnet 16 and the magnet 26 close to each other magnetically attract each other and generate a magnetic field change. When the other display device 20 is close to the casing 11, the proximity sensors 12c, 12d which are close to the other display device 20 generate a sensing signal respectively according to changes in the magnet field, referred to as a position signal in the present embodiment. The proximity sensors 22a, 22b close to the display device 10 generate a position signal respectively according to changes in the magnet field.

It should be noted that the magnet 16 disposed on the same side wall 111 has the same magnetic pole direction. Taking the display device 10 of FIG. 2 as an example, the two magnets 16 disposed on the side wall 111a have S poles to the left and N poles to the right. Further, the magnet 16 disposed on the opposite side wall 111 has the magnetic poles arranged in opposite directions. For example, the two magnets 16 disposed on the side wall 111c have S poles to the right and N poles to the left, opposite to the magnet 16 on the side wall 111a. The magnet 26 of the display device 20 is also arranged on each side wall 211 in the same manner. With the aforementioned configuration relationship, when the side wall 211a of the display device 20 is around or close to the side wall 111c of the display device 10, the magnet 16 and the magnet 26 can be magnetically attracted to each other. Accordingly, the effect of fixing the relative positions of the display device 10 and the display device 20 can be achieved.

When the display device 10 is disposed adjacent to the other display device 20, and the display device 10 detects that the display device 20 is close to the casing 11, the communication module 13 is also connected to the communication module 23 of the display device 20. Accordingly, data transmission can be performed between the processing module 14 of the display device 10 and the processing module 24 of the display device 20, to control the display screen 15 and the display screen 25 to jointly show an entire frame. Preferably, the communication modules 13, 23 in the present embodiment are Near Field Communication (NFC) modules, respectively. With the proximity of the near field communication module, the data transmission characteristics can be performed, such that the user does not need to make other settings. In other embodiments, the communication module 13, 23 can also be other types of wireless communication modules, such as but not limited to Wi-Fi local area network (LAN) modules, Bluetooth communication modules, or infrared communication modules. For the type of the wireless communication module needs stetting, when the display device 10 is adjacent to the other display device 20, the processing module 14 receives the position signal from the proximity sensors 12, and a setting interface is provided and displayed on the display screen 15 for user to operate the setting. After the setting, the processing module 14 can control the communication module 13 to communicate with the communication module 23 of the display device 20. In short, the processing module 14 can control the communication module 13 to communicate with the communication module 23 of the display device 20 according to the position signal.

In the present embodiment, the processing module 14 receives the position signal from the proximity sensors 12 (12c, 12d). After the communication module 13 is connected to the communication module 23 of the display device 20, the processing module 14 can control the display screen 15 according to a position signal to show a particular frame, which is referred to herein as a first frame. Similarly, after the processing module 24 of the display device 20 receives the position signal from the proximity sensors 22 (22a, 22b), the processing module 24 can transmit the position signal to the display device 10 via the communication module 13, and control the display screen 25 to show a particular frame, which is referred to herein as a second frame. Also, the first frame and the second frame may be combined into an entire frame. In other words, the particular frame referred to in the present embodiment refers to a part of the frame rendered according to the position of the display device 10 (or 20). In other embodiments, the processing module 24 may also control the display screen 25 to show the other particular frame (the second frame) according to the position signal, but the present disclosure is not limited thereto.

Taking the direction shown in FIG. 1 and FIG. 2 as an example, the processing module 14 can be informed that the other display device (the display device 20) exists on the side wall 111c (the lower side) according to the position of the proximity sensors 12c, 12d that issue a position signal. That is, the display device 10 is disposed on the upper side, and then the display screen 15 is controlled to show the upper half of the entire frame (the first frame). Similarly, the processing module 24 can be informed that the other display device (the display device 10) exists on the side wall 111a (the upper side) according to the position of the proximity sensors 22a, 22b that issue a position signal. That is, the display device 20 is disposed on the lower side. The processing module 14 (or the processing module 24) controls the display screen 25 to show the upper half of the entire frame (the second frame).

Similarly, if the display device 20 is disposed adjacent to the right side of the display device 10, that is, next to the side wall 111b, the processing module 14 can receive the position signal from the proximity sensors 12b, 12c, and determine that the display device 10 is disposed on the left side, thereby controlling the display screen 15 to show the left half of the entire frame (the first frame). The processing module 24 of the display device 20 receives the position signal from the proximity sensors 22a, 22d, and determines that the display device 20 is disposed on the right side, and the processing module 14 (or the processing module 24) controls the display screen 25 to show the right half of the entire frame (the second frame).

For the user to expand the screen, only needs to place the two display devices 10, 20 adjacent to each other, the communication module 13 can communicate with the communication module 23, and the magnets 16, 26 close to each other can generate a magnetic field change. The corresponding proximity sensors 12, 22 (magnetic field sensors) detect the change of the magnetic field, and respectively generate a position signal, such that the processing module 14 of the display device 10 can control the display screen 15 to shows an upper half screen (the first frame) according to the position signal, and the display screen 25 to show a lower half screen (the second frame). Meanwhile, the magnets 16, 26 which are close to each other can magnetically attract each other, thereby fixing the relative position of the two display devices 10, 20 to avoid misplacement and displacement.

Figure 3:
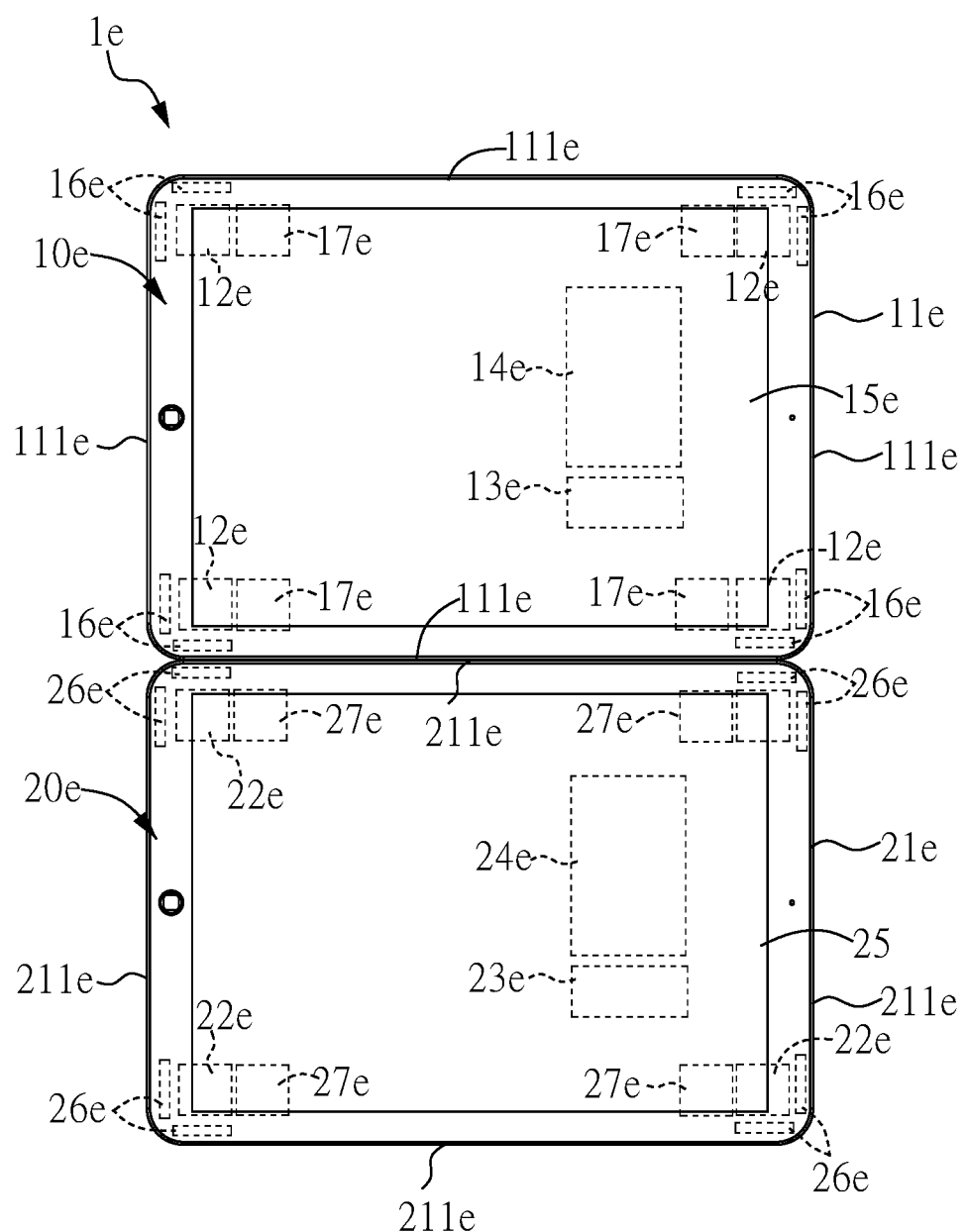
FIG. 3 is a schematic diagram of a combination display device in another embodiment of the present invention.

In another embodiment, the proximity sensors can also be optical proximity sensors. FIG. 3 is a schematic diagram of the combination display device in another embodiment of the present disclosure. Referring to FIG. 3, in the present embodiment, the proximity sensors 12e, 22e are optical proximity sensors. Specifically, the display device 10e further includes an infrared emitting unit 17e, and the display device 20e further includes an infrared emitting unit 27e. The infrared emitting units 17e, 27e can emit infrared light. When the display device 20e is adjacent to the display device 10e, not only the communication module 13e and the communication module 23e communicating with each other, but also the proximity sensors 12e close to the display device 20e can receive infrared light (which can be the reflected light of the infrared light emitted by the infrared emitting unit 17e or the infrared light emitted by the infrared emitting unit 27e), such that the proximity sensors 12e correspondingly generate a position signal. Then, the processing module 14e controls the display screen 15e to show the first frame according to the position signal. Similarly, the proximity sensors 22e close to the display device 10e also receive the infrared light to generate the position signal, and the processing module 24e controls the display screen 25e according to the position signal to show the second frame. For further details, refer to the foregoing embodiment, which are not described herein.

In the present embodiment, the display devices 10e, 20e also include a plurality of magnets 16e, 26e. The magnets 16e, 26e are respectively disposed on the side walls 111e, 211e of the casings 11e, 21e, for fixing the relative position of the adjacent display devices 10e, 20e. For the number and configuration of the magnets 16e, 26e of the present embodiment, refer to the foregoing embodiment. Taking the magnet 16e as an example, the number of magnets 16e is twice that of the side wall 111e, and the magnet 16e is respectively disposed at the opposite ends of the side wall 111e. When the display device 20e is adjacent to the display device 10e, the magnets 16e is magnetically attracted to the magnet 26e. This achieves the effects of fixing the relative position of the display devices 10e and 20e.

Additionally, in the present embodiment, two display devices (the display device 10 and 20) are used in combination to form a combination display device 1 as an example. In other embodiments, the display device can be expanded to more than two display devices, but the present disclosure is not limited thereto. When users watch movies or play video games on their own, they can use a single display device 10. In the case that friends visit you, the display device 10, 20 can be used in combination to expand the display for multiple people to watch movies or play games. Therefore, in the present embodiment, besides the display can be expanded, the combination display device 1 can also be used in an electronic version of a board game. The plurality of display devices 10, 20 jointly show the frame of the board game for multiple people to play.

As above, the display device according to the present disclosure includes a casing, a plurality of proximity sensors, communication module, a display screen, and a processing module. Each of the proximity sensors is disposed on each side wall of the casing. The proximity sensors generate a position signal when detecting that there is other display device close to the casing. The processing module can determine the position of the display device according to the position signal to control the display screen to show a particular frame without complicated settings, which is quite convenient in operation.

It should be noted that the embodiments of the present disclosure described above are only illustrative. All without departing from the scope of the disclosure are defined solely by the appended claims.

What is claimed is:

1. A display device, comprising:
   a casing having a plurality of side walls;
   a plurality of magnets respectively, two of the magnets respectively disposed at two ends of each side wall, two of the magnets disposed on the same side wall having the same magnetic pole direction, and two of the magnets disposed on the opposite side wall having the magnetic poles arranged in opposite directions
   a plurality of proximity sensors, each of the proximity sensors being disposed on each said side wall of the casing and each of the proximity sensors is a magnetic field sensor, when another display device is close to the casing, the magnet close to the other display device is magnetically attracted to a magnet of the other display device, and the proximity sensor closed to the other display device generates a position signal according to changes in a magnetic field;
   a communication module disposed in the casing, and used for communicating with the other display device;
   a display screen disposed in the casing; and
   a processing module electrically connected to the proximity sensors and the communication module, the processing module controlling the display screen to display a particular frame according to the position signal, and the display screen of the other display device to display another particular frame via the communication module, wherein the particular frame be capable of being combined with the other particular frame to be an entire frame.

2. The display device as claimed in claim 1, wherein the number of proximity sensors is the same as the number of the side walls.

3. The display device as claimed in claim 2, wherein the proximity sensors are respectively disposed at corners defined between every two of the side walls being adjacent.

4. The display device as claimed in claim 1, wherein the number of the magnets is twice the number of the side walls.

* * * * *